United States Patent [19]

Asai

[11] 4,360,482
[45] Nov. 23, 1982

[54] AIR-FUEL RATIO CONTROLLER OF VARIABLE-VENTURI TYPE CARBURETOR

[75] Inventor: Toshimichi Asai, Aichi, Japan

[73] Assignee: Aisan Industry Co., Ltd., Aichi, Japan

[21] Appl. No.: 314,598

[22] Filed: Oct. 26, 1981

[30] Foreign Application Priority Data

Oct. 29, 1980 [JP] Japan .............................. 55-151652

[51] Int. Cl.³ .............................................. F02M 9/06
[52] U.S. Cl. ............................. 261/44 C; 261/121 B; 261/DIG. 74
[58] Field of Search .......... 261/44 C, 121 B, DIG. 74

[56] References Cited

U.S. PATENT DOCUMENTS

| | | | |
|---|---|---|---|
| 2,216,677 | 10/1940 | Schuttler | 261/121 B |
| 3,984,503 | 10/1976 | Gistucci | 261/44 C |
| 4,111,169 | 9/1978 | Lawrence | 261/121 B |
| 4,290,399 | 9/1981 | Takada et al. | 261/44 C |

FOREIGN PATENT DOCUMENTS

| | | |
|---|---|---|
| 2719775 | 7/1978 | Fed. Rep. of Germany ... 261/121 B |
| 41-3529 | 2/1941 | Japan . |
| 41-11605 | 5/1941 | Japan . |
| 38-19402 | 1/1955 | Japan . |
| 51-46622 | 4/1976 | Japan . |
| 51-42269 | 11/1976 | Japan . |
| 52-36233 | 3/1977 | Japan .............................. 261/121 B |
| 53-22929 | 3/1978 | Japan .............................. 261/121 B |
| 55-37543 | 3/1980 | Japan .............................. 261/44 C |

*Primary Examiner*—Tim R. Miles

[57] ABSTRACT

An air-fuel ratio controller of a variable-venturi type carburetor having an air inlet port opening at the upstream side of the suction piston, a branching chamber connected to a passage leading from the air inlet port and branching the passage into a bleed-side passage leading to the bleed portion of the carburetor and a by-pass passage leading to the downstream side of the suction piston, and a valve device disposed in the branching chamber. The valve device is adapted to move reciprocatingly to vary the areas of the bleed-side passage and the by-pass passage relatively in such a manner that, when the area of one of the passages is increased, the area of the other passage is decreased. In consequence, the position of the suction piston is never changed by the change in the amount of bleed air, so that the control of the air-fuel ratio of the mixture is very much facilitated.

5 Claims, 8 Drawing Figures

AIR-FUEL RATIO CONTROLLER OF VARIABLE-VENTURI TYPE CARBURETOR

BACKGROUND OF THE INVENTION

1. Field of the Invention

The present invention relates to an air-fuel controller for use in carburetors of variable-venturi type.

2. Description of the Prior Art

In the conventional carburetors of variable-venturi type, as the amount of bleed is increased and decreased, the bleed comes into a mixing chamber by-passing the venturi portion of the carburetor, so that the position of a suction piston is changed in accordance with the change in the amount of bleed. In consequence, in the region where the flow rate of intake air is small as in the case of idling, the change in the amount of bleed causes a large change in the position of the suction piston, resulting in a large change in the air-fuel ratio of the mixture.

In consequence, an air-fuel ratio characteristic as shown in FIG. 1 is obtained to make the control of the air-fuel ratio extremely difficult.

SUMMARY OF THE INVENTION

Accordingly, an object of the invention is to provide an air-fuel ratio controller which can eliminate the above-described problems of the prior art.

To this end, according to the invention, there is provided an air-fuel ratio controller having an air inlet port 9 provided at the upstream side of a suction piston, a passage connected to the air inlet port 9 and branching into a bleed side passage 14 leading to a bleed portion 17 and by-pass passage 15 leading to the downstream side of the suction piston, a valve device disposed at the branching portion of the passage and operable such that, when the area of one of the bleed side passage 14 and the by-pass passage 15 is increased, the area of the other passage is decreased, and suitable actuating means for actuating the valve device.

The above and other objects, as well as advantageous features of the invention will become clear from the following description of the preferred embodiments taken in conjunction with the accompanying drawings.

DESCRIPTION OF THE PREFERRED EMBODIMENTS:

Preferred embodiments of the invention will be described hereinunder with reference to the attached drawings.

Figure 2:
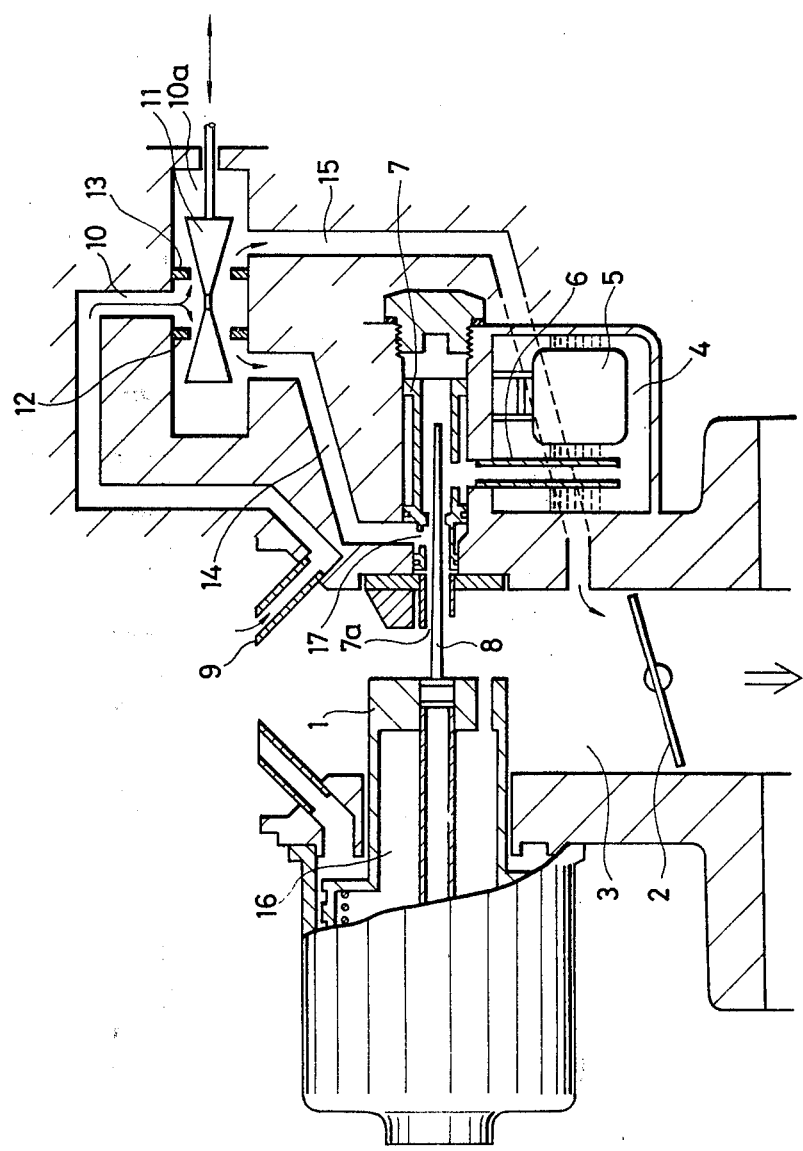
FIG. 2 is a sectional view of an air-fuel ratio controller embodying the present invention.

Referring to FIG. 2 showing an embodiment of the invention, a reference numeral 1 denotes a suction piston of a variable-venturi type carburetor, 2 denotes a throttle valve, 3 denotes a mixing chamber, 4 denotes a float chamber, and 5 denotes a float.

The fuel in the float chamber 4 is sucked by a main jet 7 through a fuel pipe 7. This fuel is discharged into the intake air passage of the carburetor through a fuel discharge port 7a, after a pressure reduction by the bleed and a metering by a cooperation of a metering jet 8 and the main jet 7.

A reference numeral 9 denotes an air inlet port 9 for the bleed air opening at the upstream side of the suction piston 1, and is communicated with a passage 10 and an air branching chamber 10a at which the passage 10 is branched into a bleed side passage 14 and a by-pass passage 15. The bleed-side passage 14 leads to the bleed portion 17, while the by-pass passage 15 is in communication with the afore-mentioned mixing chamber 3. A bleed-side seat 12 and a by-pass-side seat 13 are formed in the air branching chamber 10a. These seats are adapted to cooperate with a common valve 10. In this embodiment, the seats 12,13 have annular forms, while the valve 11 has two conical valve portions integrated with each other in a back-to-back relation with the larger-diameter portion positioned at the outer side. The arrangement is such that, as the valve 11 is moved to the left as viewed in the drawings, the area of the air passage through the bleed-side seat 12 is increased while the area of the air passage through the by-pass side seat 13 is decreased, whereas the areas of these passages are decreased and increased as the valve 11 is moved to the right as viewed in the drawings.

Figure 6:
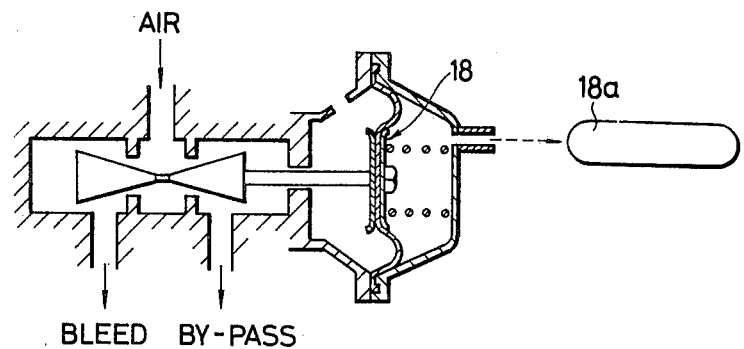
FIGS. 6 to 8 are sectional views of valves actuating means.
Figure 7:
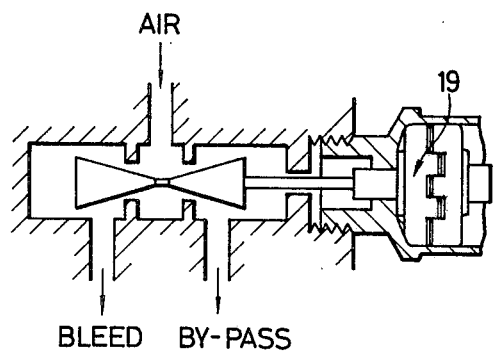
Figure 8:
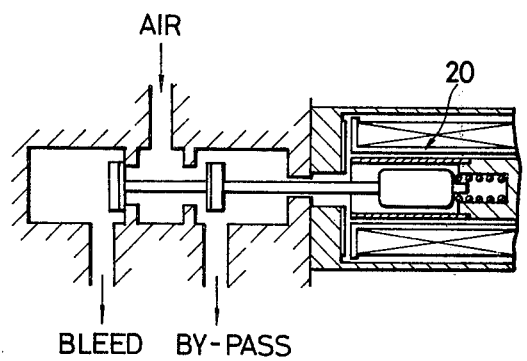

The valve 11 is adapted to be actuated by an actuating means which may be a combination of a diaphragm 18 connected to the valve 11 and a pressure controller 18a adapted to control the operation of the diaphragm 18, as shown in FIG. 6. Alternatively, as shown in FIG. 7, the valve 11 may be actuated by a stepper motor 19. It is also possible to actuate the valve 11 by means of a solenoid as shown in FIG. 8.

Figure 3:
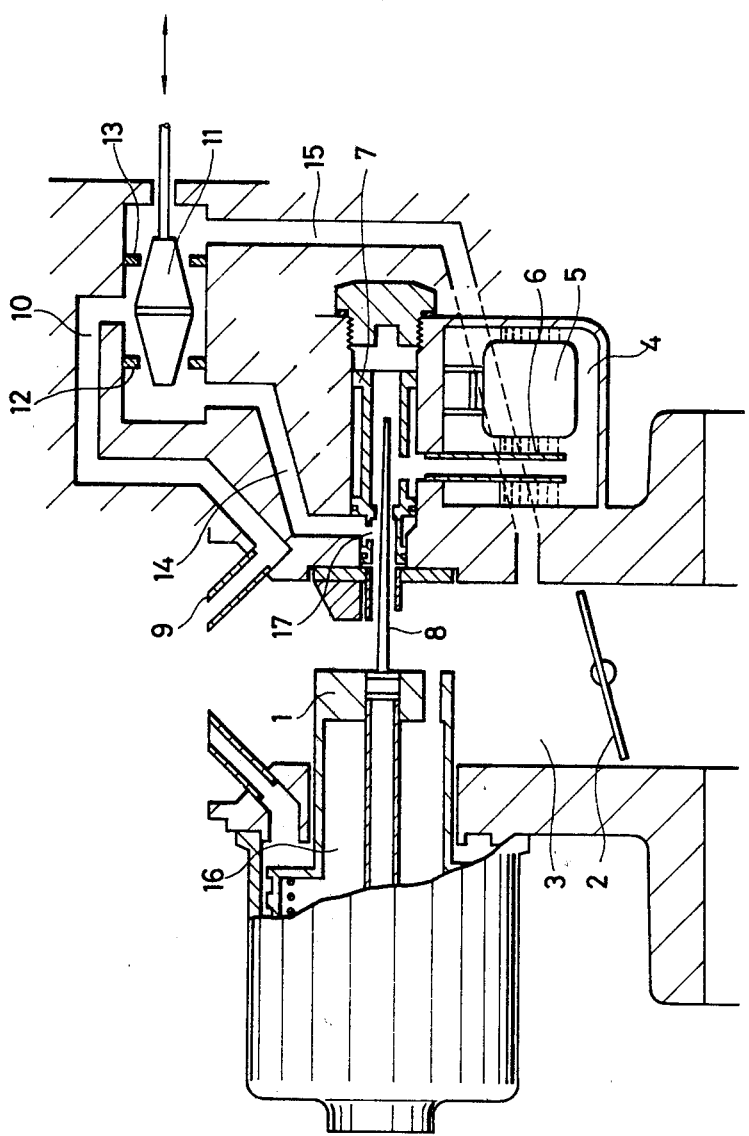
FIGS. 3 to 5 are sectional views of different embodiments having different forms of valve.

In another embodiment shown in FIG. 3, tfhe valve 11 of FIG. 2 is modified such that the smaller diameter portion thereof is positioned at the outer side.

Figure 4:
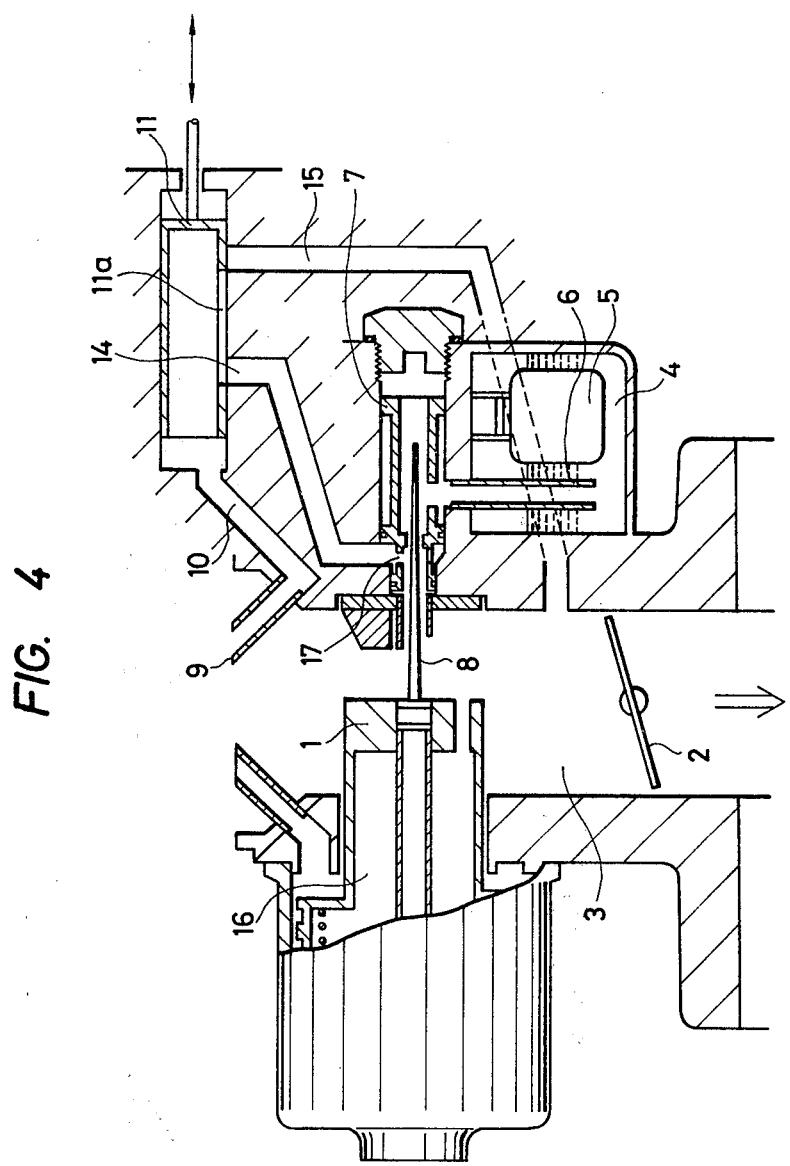
Figure 5:
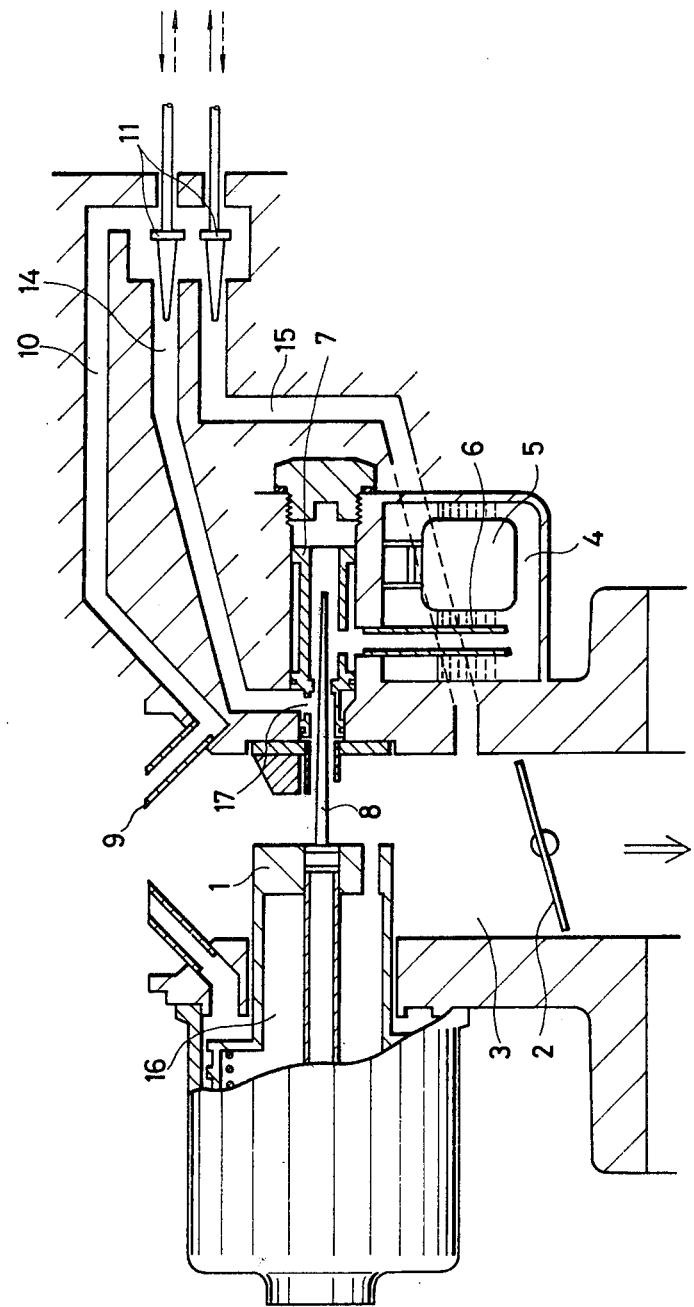

In still another embodiment shown in FIG. 4, the valve 11 is formed in a cylindrical form and is provided with a longitudinal slit 11a. The valve 11 is movable in the axial direction so that, when one of the passages is blocked, the other passage is opened. FIG. 5 shows a further embodiment in which separate valve members are used to open and close the passages 14,15 independently.

The air-fuel ratio controller of the invention has the construction described heretofore.

The operation of the air-fuel ratio controller will be described with reference to the embodiment shown in FIG. 2 by way of example. As the valve 11 is moved to the left to increase the amount of bleed to form a leaner mixture, the area of the annular air passage on the bleed-side seat 12 is increased so that the air coming from the air inlet port 9 is supplied at a large rate to the bleed portion 17. At the same time, the area of the annular passage on the by-pass seat 13 is decreased so that the flow rate of the air flowing into the mixing chamber 3 through the by-pass passage 15 is decreased.

To the contrary, as the valve 11 is moved to the right to reduce the amount of bleed, the flow rate of air to the bleed passage 14 is decreased and the flow rate of the air to the by-pass passage 15 is increased.

Thus, according to the invention, the flow rate of the air by-passing the suction piston 1 is maintained substantially constant so that the position of the suction piston is not changed even when the amount of bleed is changed, and the air-fuel ratio is controlled solely by means of the pressure change in the main jet.

Figure 1:
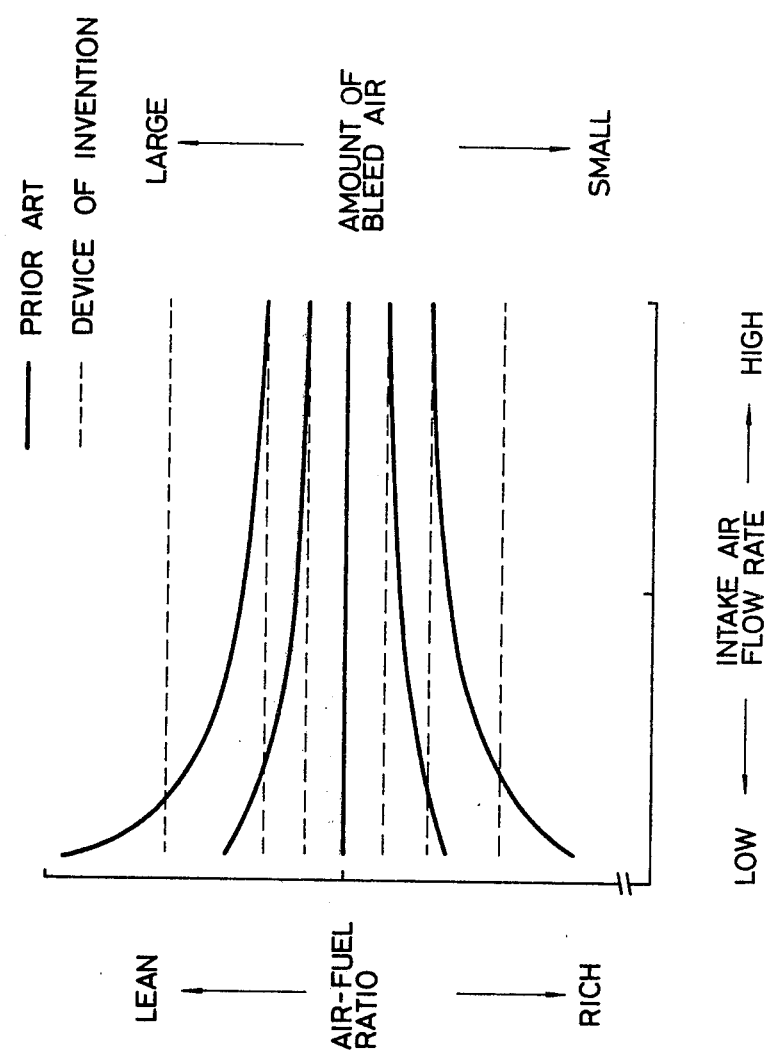
FIG. 1 is a chart showing the air-fuel ratio characteristics of a conventional device (full line) and an air-fuel ratio controller of the invention (broken line) in relation to the amount of bleed.

As has been described, according to the invention, such air-fuel ratio characteristics are obtained that the curves for respective bleeds are parallel to one another over the entire region of air flow rate as shown by broken-lines in FIG. 1, whereas, in the conventional device, the characteristics curves (full-line curves) are substantially parallel only in the region of high air flow rate and diverge in the region of low air flow rate.

In consequence, the air-fuel ratio control by means of the bleed amount is simplified considerably and the feedback of the air-fuel ratio by means of the amount of bleed is simplified considerably.

In the conventional device, the maximum controllable width of the air-fuel ratio is determined in the region of low air flow rate while, in the region of high air flow rate, it is not possible to obtain a sufficiently large controllable width. In contrast to the above, according to the invention, it is possible to obtain a sufficiently large controllable width of air-fuel ratio even in the region of high air flow rate.

What is claimed is:

1. An air-fuel ratio controller of a variable-venturi type carburetor comprising:
   an air inlet port opening at the upstream side of a suction piston of said carburetor;
   a branching chamber communicated with a passage leading from said air inlet port and branching said passage into a bleed side passage communicating with a bleed portion and a by-pass passage communicating with the downstream side of said suction piston;
   and a valve device disposed in said branching chamber and adapted to increase and decrease the areas of said bleed-side passage and by-pass passages relatively to each other in an inverse relationship.

2. An air-fuel controller of a variable-venturi type carburetor as claimed in claim 1, wherein said valve device includes a valve having two conical valve members integrated with each other at their smaller ends and annular valve seats defining said bleed-side passage and said by-pass passage, said conical valve members being partially received by said conical valve seats, said valve being adapted to move reciprocatingly in said valve seats to cause an increase and decrease of areas of said passages relatively to each other.

3. An air-fuel ratio controller of a variable-venturi type carburetor as claimed in claim 1, wherein said valve device includes a valve having two conical valve portions integrated with each other at their larger ends such that the smaller ends are positioned at the outer sides, and a pair of annular seats defining said bleed-side passages and said by-pass passage, said valve being partially received by said annular seats.

4. An air-fuel ratio controller of a variable-venturi type carburetor as claimed in claim 1, wherein said valve device includes a valve having a cylindrical form with one opened end and a longitudinal slit.

5. An air-fuel ratio controller of a variable-venturi type carburetor as claimed in claim 1, wherein said valve device includes separate valve members for said bleed-side passage and said by-pass passages, respectively, and means for actuating said valve members relatively to each other.

* * * * *